(12) United States Patent
Scheuermann

(10) Patent No.: US 7,433,909 B2
(45) Date of Patent: Oct. 7, 2008

(54) PROCESSING ARCHITECTURE FOR A RECONFIGURABLE ARITHMETIC NODE

(75) Inventor: W. James Scheuermann, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 872 days.

(21) Appl. No.: 10/443,596

(22) Filed: May 21, 2003

(65) Prior Publication Data

US 2004/0030736 A1 Feb. 12, 2004

Related U.S. Application Data

(60) Provisional application No. 60/391,874, filed on Jun. 25, 2002.

(51) Int. Cl.
*G06F 17/14* (2006.01)

(52) U.S. Cl. .................................... 708/400

(58) Field of Classification Search ............... 708/400, 708/300
See application file for complete search history.

(56) References Cited

U.S. PATENT DOCUMENTS

| | | | |
|---|---|---|---|
| 4,758,985 A * | 7/1988 | Carter .......................... | 365/94 |
| 4,905,231 A | 2/1990 | Leung et al. | |
| 5,144,166 A | 9/1992 | Camarota et al. | |
| 5,218,240 A | 6/1993 | Camarota et al. | |
| 5,245,227 A | 9/1993 | Furtek et al. | |
| 5,336,950 A | 8/1994 | Popli et al. | |
| 5,388,062 A * | 2/1995 | Knutson ..................... | 708/323 |
| 5,450,557 A | 9/1995 | Kopp et al. | |
| 5,646,544 A | 7/1997 | Iadanza | |
| 5,729,754 A * | 3/1998 | Estes ............................ | 712/15 |
| 5,737,631 A | 4/1998 | Trimberger | |
| 5,796,957 A | 8/1998 | Yamamoto et al. | |
| 5,802,055 A | 9/1998 | Krein et al. | |
| 5,828,858 A | 10/1998 | Athanas et al. | |
| 5,889,816 A | 3/1999 | Agrawal et al. | |
| 5,892,961 A | 4/1999 | Trimberger | |
| 5,907,580 A | 5/1999 | Cummings | |
| 5,910,733 A | 6/1999 | Bertolet et al. | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 6,023,742 A | 2/2000 | Ebeling et al. | |
| 6,088,043 A | 7/2000 | Kelleher et al. | |
| 6,094,065 A | 7/2000 | Tavana et al. | |
| 6,119,178 A | 9/2000 | Martin et al. | |
| 6,120,551 A | 9/2000 | Law et al. | |
| 6,150,838 A | 11/2000 | Wittig et al. | |
| 6,230,307 B1 | 5/2001 | Davis et al. | |
| 6,237,029 B1 | 5/2001 | Master et al. | |
| 6,266,760 B1 | 7/2001 | DeHon et al. | |

(Continued)

*Primary Examiner*—Tan V. Mai
(74) *Attorney, Agent, or Firm*—Patterson & Sheridan, L.L.P.

(57) ABSTRACT

A computational unit, or node, in a adaptable computing system is described. A preferred embodiment of the node allows the node to be adapted for use for any of ten types of functionality by using a combination of execution units with a configurable interconnection scheme. Functionality types include the following: Asymmetric Finite Impulse Response (FIR) Filter, Symmetric FIR Filter, Complex Multiply/FIR Filter, Sum-of-absolute-differences, Bi-linear Interpolation, Biquad Infinite Impulse Response (IIR) Filter, Radix-2 Fast Fourier Transform (FFT)/Inverse Fast Fourier Transform (IFFT), Radix-2 Discrete Cosign Transform (DCT)/Inverse Discrete Cosign Transform (IDCT), Golay Correlator, Local Oscillator/Mixer.

18 Claims, 14 Drawing Sheets

U.S. PATENT DOCUMENTS

| | | |
|---|---|---|
| 6,282,627 B1 | 8/2001 | Wong et al. |
| 6,353,841 B1 | 3/2002 | Marshall et al. |
| 6,381,293 B1 | 4/2002 | Lee et al. |
| 6,408,039 B1 | 6/2002 | Ito |
| 6,426,649 B1 * | 7/2002 | Fu et al. .................. 326/41 |
| 6,433,578 B1 | 8/2002 | Wasson |
| 6,483,343 B1 * | 11/2002 | Faith et al. ................ 326/40 |
| 6,510,138 B1 | 1/2003 | Pannell |
| 6,675,284 B1 | 1/2004 | Warren |
| 6,694,380 B1 | 2/2004 | Wolrich et al. |
| 6,859,434 B2 | 2/2005 | Segal et al. |
| 6,941,336 B1 * | 9/2005 | Mar .......................... 708/801 |
| 6,980,515 B1 | 12/2005 | Schunk et al. |
| 2001/0052793 A1 | 12/2001 | Nakaya |
| 2002/0042875 A1 | 4/2002 | Shukla |
| 2002/0138716 A1 | 9/2002 | Master et al. |
| 2002/0184275 A1 * | 12/2002 | Dutta et al. ................ 708/300 |
| 2003/0074473 A1 | 4/2003 | Pham et al. |

* cited by examiner

| | | | | |
|---|---|---|---|---|
| Mem1 | c | d | | |
| Mem2 | a | | b | a |
| Mem1_rf | | | c | d |
| Mult_op1 | Mem1 | Mem1 | Mem1_rf | Mem1_rf |
| Mult_op2 | Mem2 | Mem2 | Mem2 | Mem2 |
| Mult | a x c | b x d | b x c | a x d |
| Pipeline Reg | | a x c | | b x c |
| ALU | | ac-bd | | ad+bc |

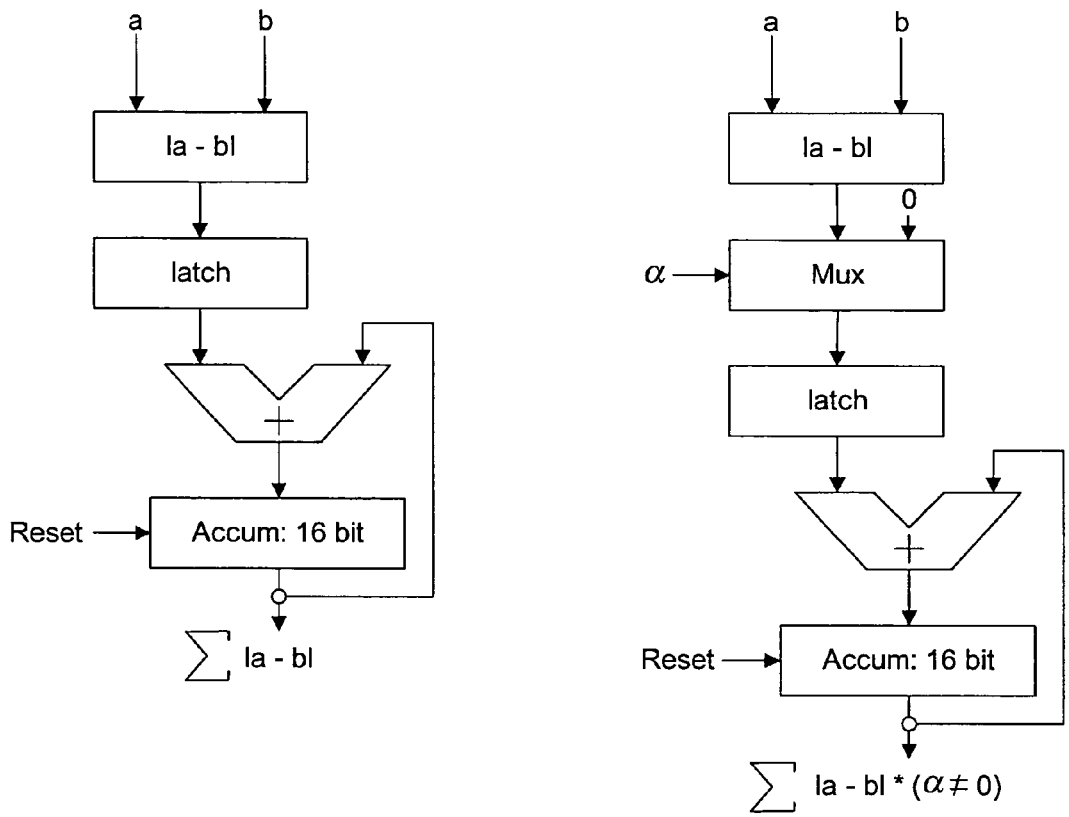
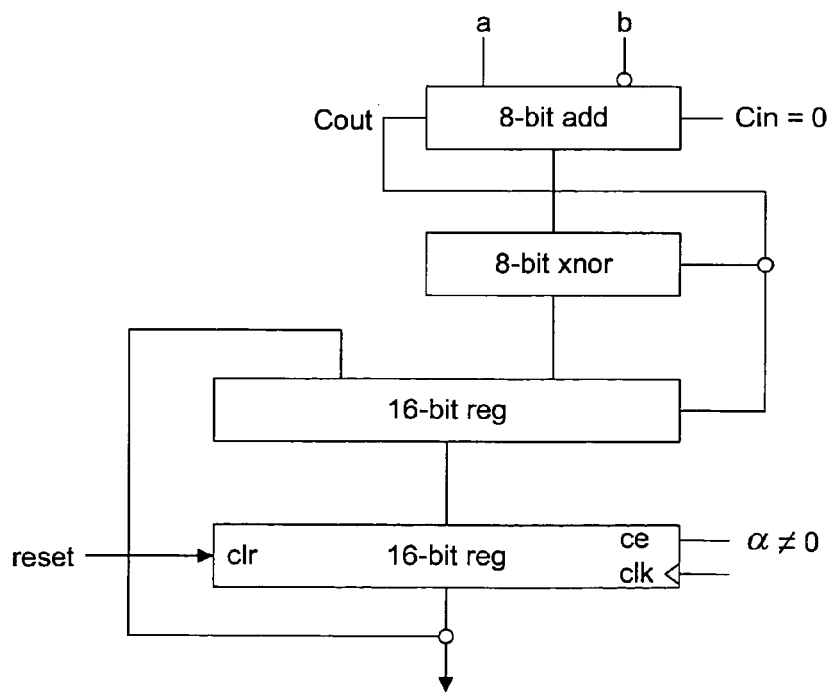
Fig. 9

| MEM | A | B | C | D |
|---|---|---|---|---|
| REG1 | | A | | C |
| ALU1 | pass | add A+B | add A+C | add C+D |
| REG2 | | | A+B | |
| ALU2 | pass | pass | pass | add A+B C+D |
| OUT | A | B | C | D |
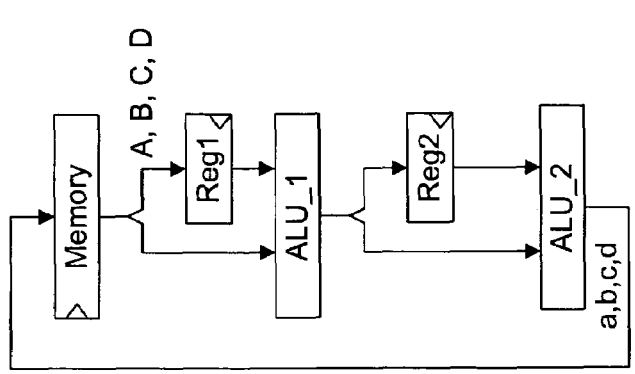
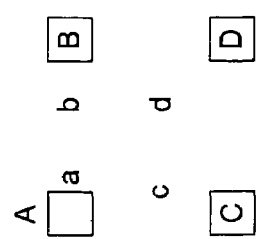
Fig. 10

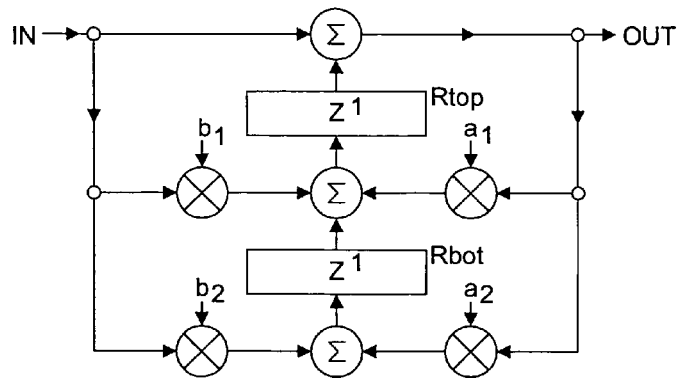

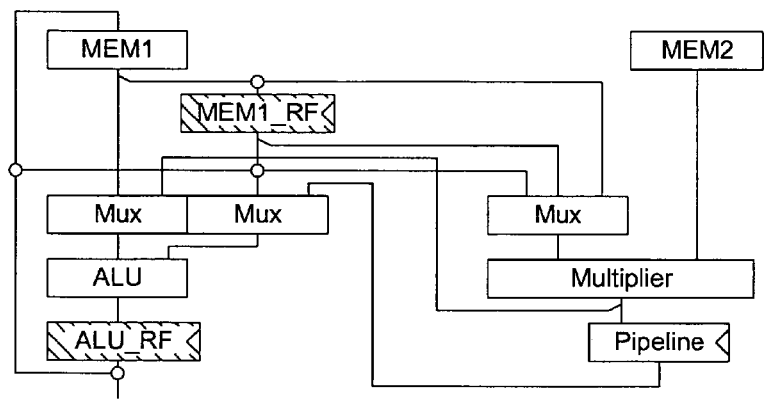

| MEM1 | R-top | IN | R-bot | | |
|---|---|---|---|---|---|
| MEM2 | $b_1$ | $b_2$ | $a_2$ | $a_1$ | |
| MEM1_RF | R-top | IN | | | |
| ALU_OP1 | Mem1 | Mem1 | Mult | Mult | ALU_RF |
| ALU_OP2 | Mem1_Reg | Mult_Reg | Mult_Reg | | (Top) |
| ALU | IN+R-top | | | New R-top | $b_2 \times$ IN+$a_2 \times$ |
| WRT ALU_RF(out) | | IN+R-top | | | (IN+R-top) |
| MULT_OP1 | Mem1 | Mem1_RF | ALU_RF (out) | | R-bot+$b_1 \times$ IN |
| MULT_OP2 | Mem2 | Mem2 | Mem2 | Mem2 | $a_2 \times$ |
| MULT | $b_1 \times$ IN | $b_2 \times$ IN | | | (IN+R+top) |
| MULT_REG | | $b_1 \times$ IN | $b_2 \times$ IN | | $a_1 \times$ |
| WRT ALU_RF(top) | | | R-bot + $b_1 \times$ IN | New R-top | (IN+R+top) |
| WRT ALU_RF(top) | | | New R-bot | | |
| READ ALU_RF | | | OUT=(IN+R-top) | New R-bot | New R-top |

Fig. 11

| | | | | | CONFIGURATIONS | | | | |
|---|---|---|---|---|---|---|---|---|---|
| TARGET | ASYM FIR | SYM FIR | CMPX MPY | SAD | BI-LIN-INTP | BI-QUAD IIR | FFT/IFFT | DCT/IDCT |
| XNOR/ADD | MEM1 | MEM1 + RF2 | MEM1 | XNOR (MEM1 + + 1 MEM2) | MEM1 \| MEM1 + RF2 | MEM1 | MEM1 | MEM1 |
| MULT OP1 | XNOR/ADD 1 REG FILE2 | XNOR/ADD | XNOR/ADD 1 REG FILE2 | - | - | XNOR/ADD \| RF1 \| RF2 | XNOR/ADD \| REG FILE2 | XNOR/ADD \| RF1 \| RF2 |
| MULT OP2 | MEM2 | MEM2 | MEM2 | - | - | MEM2 | MEM2 | MEM2 |
| PIPELINE | - | - | MULT | - | ALU2 | MULT | MULT | ALU2 \| MULT |
| ALUs OP1 | MULT | MULT | MULT | XNOR/ADD | XNOR/ADD | XNOR/ADD \| MULT | MULT \| RP1 | MULT1 RF1 \| RF2 |
| ALUs OP2 | REG FILE1 | REG FILE1 | PIPELINE | REF FILE1 | PIPELINE | PIPELINE \| RF1 \| RF2 | PIPELINE \| XNOR/ADD | PIPELINE \| RF1 \| RF2 |
| REG FILE1 | ALU1 | ALU1 | - | ALU1 | - | ALU1 | ALU1 | ALU1 |
| REG FILE2 | MEM1 | MEM1 | MEM1 | MEM1 | MEM1 | MEM1 | MEM1 | ALU2 |
| OUT | REG FILE1 | REG FILE1 | ALU2 | REG FILE1 | ALU2 | REG FILE1 | ALU2 \| RF1 | ALU2 \| RF1 |

Fig. 15

PROCESSING ARCHITECTURE FOR A RECONFIGURABLE ARITHMETIC NODE

CLAIM OF PRIORITY

This application claims priority from U.S. Provisional Patent Application Ser. No. 60/391,874, filed on Jun. 25, 2002 entitled "DIGITAL PROCESSING ARCHITECTURE FOR AN ADAPTIVE COMPUTING MACHINE"; which is hereby incorporated by reference as if set forth in full in this document for all purposes.

CROSS-REFERENCES TO RELATED APPLICATIONS

This application is related to U.S. patent application Ser. No. 09/815,122, filed on Mar. 22, 2001, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS."

This application is also related to the following copending applications:

U.S. patent application Ser. No. 10/443,501, filed on May 21, 2003; entitled "HARDWARE TASK MANAGER FOR ADAPTIVE COMPUTING"; and U.S. patent application Ser. No. 10/443,554, filed on May 21, 2003 entitled, "UNIFORM INTERFACE FOR A FUNCTIONAL NODE IN AN ADAPTIVE COMPUTING ENGINE".

BACKGROUND OF THE INVENTION

The design of processing architectures is crucial to improving the speed, power and efficiency of digital processing systems. More complex computing systems generally require more innovative architecture design in order to maximize the utility of the available processing power.

One tradeoff that is often made in processing architecture design is the tradeoff between speed, complexity and reconfigurability. For example, where a unit, e.g., an execution unit is highly configurable. There is more of a burden in controlling the unit. A reconfigurable unit needs to receive control signals to set up the configuration. Also, the unit's configuration is dependent on the higher-level tasks that are being performed, or solved, within the overall system.

Thus, it is desirable to provide features for a digital processing architecture that improve upon one or more shortcomings in the prior art.

SUMMARY OF THE INVENTION

The present invention includes a reconfigurable arithmetic node (RAN) that allows the performance of the RAN to be optimized depending on a specific task, or algorithm, to be executed within an interval of time. A preferred embodiment of the invention allows a RAN to be configured differently for eight different algorithms as follows: Asymmetric Finite-Impulse Response (FIR) Filter, Symmetric FIR Filter, Complex Multiply/FIR Filter, Sum-Of-Absolute-Differences (SAD), Bi-Linear Interpolation, BiQuad Infinite Impulse Response (IIR) Filter, Radix-2 Fast Fourier Transform (FFT)/Inverse FFT (IFFT), and Radix-2 Discrete Cosign Transform (DCT)/Inverse DCT (IDCT).

The RAN is provided with interconnection ability to various computational elements and memories. The configurations of RAN and associated components are optimized so that each algorithm can execute in only a few clock cycles. For example, an IDCT algorithm which requires 16 multiplications and 26 additions/subtractions can be performed in 16 clock cycles using an execution unit that has one multiplier and two adder/subtractors.

In one embodiment the invention provides a computational unit in an adaptable computing system, the computational unit comprising a plurality of execution units coupled by a configurable interconnection; and a configuration system for configuring the interconnection in response to a control signal.

BRIEF DESCRIPTION OF THE DRAWINGS

FIG. 9 illustrates a MPEG-4 sum of absolute differences unit;

FIG. 10 illustrates an execution unit for MPEG bi-linear interpolation;

FIG. 11 illustrates a single multiplier, BiQuad IIR filter;

FIG. 15 illustrates a reconfigurable execution unit operands/operations summary.

DETAILED DESCRIPTION OF THE PREFERRED EMBODIMENTS

A detailed description of an adaptive computing engine architecture used in a preferred embodiment is provided in the patents referenced above. The following section provides a summary of the architecture described in the referenced patents.

Adaptive Computing Engine

Figure 16:
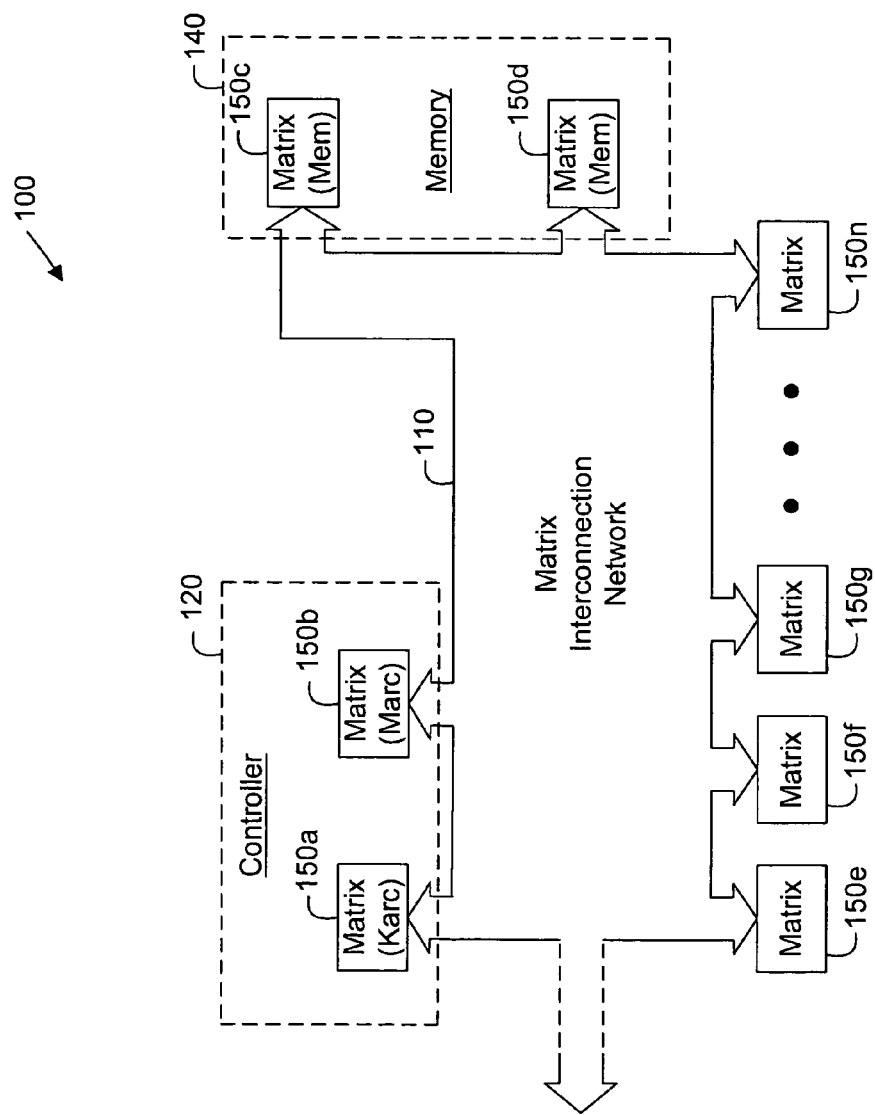
FIG. 16 shows an overview of an adaptable computing engine architecture.

FIG. 16 is a block diagram illustrating an exemplary embodiment in accordance with the present invention. Apparatus 100, referred to herein as an adaptive computing engine (ACE) 100, is preferably embodied as an integrated circuit, or as a portion of an integrated circuit having other, additional components. In the exemplary embodiment, and as discussed in greater detail below, the ACE 100 includes one or more reconfigurable matrices (or nodes) 150, such as matrices 150A through 150N as illustrated, and a matrix interconnection network 110. Also in the exemplary embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

In a preferred embodiment, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140.

The matrices 150 configured to function as memory 140 may be implemented in any desired or exemplary way, utilizing computational elements (discussed below) of fixed memory elements, and may be included within the ACE 100 or incorporated within another IC or portion of an IC. In the exemplary embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E2PROM. In the exemplary embodiment, the memory 140 preferably includes direct memory access (DMA) engines, not separately illustrated.

The controller 120 is preferably implemented, using matrices 150A and 150B configured as adaptive finite state machines (FSMs), as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module.

Figure 7:
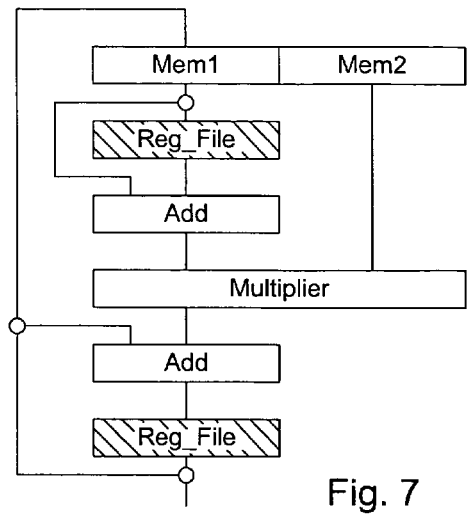
FIG. 7 shows a single multiplier, symmetric FIR.
Figure 8:
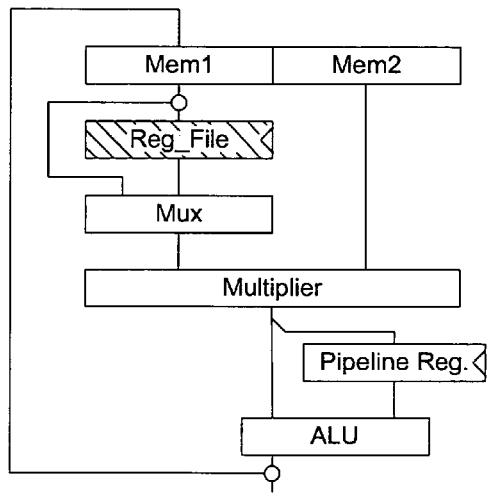
FIG. 8 shows a four-cycle complex multiplier.
Figure 12:
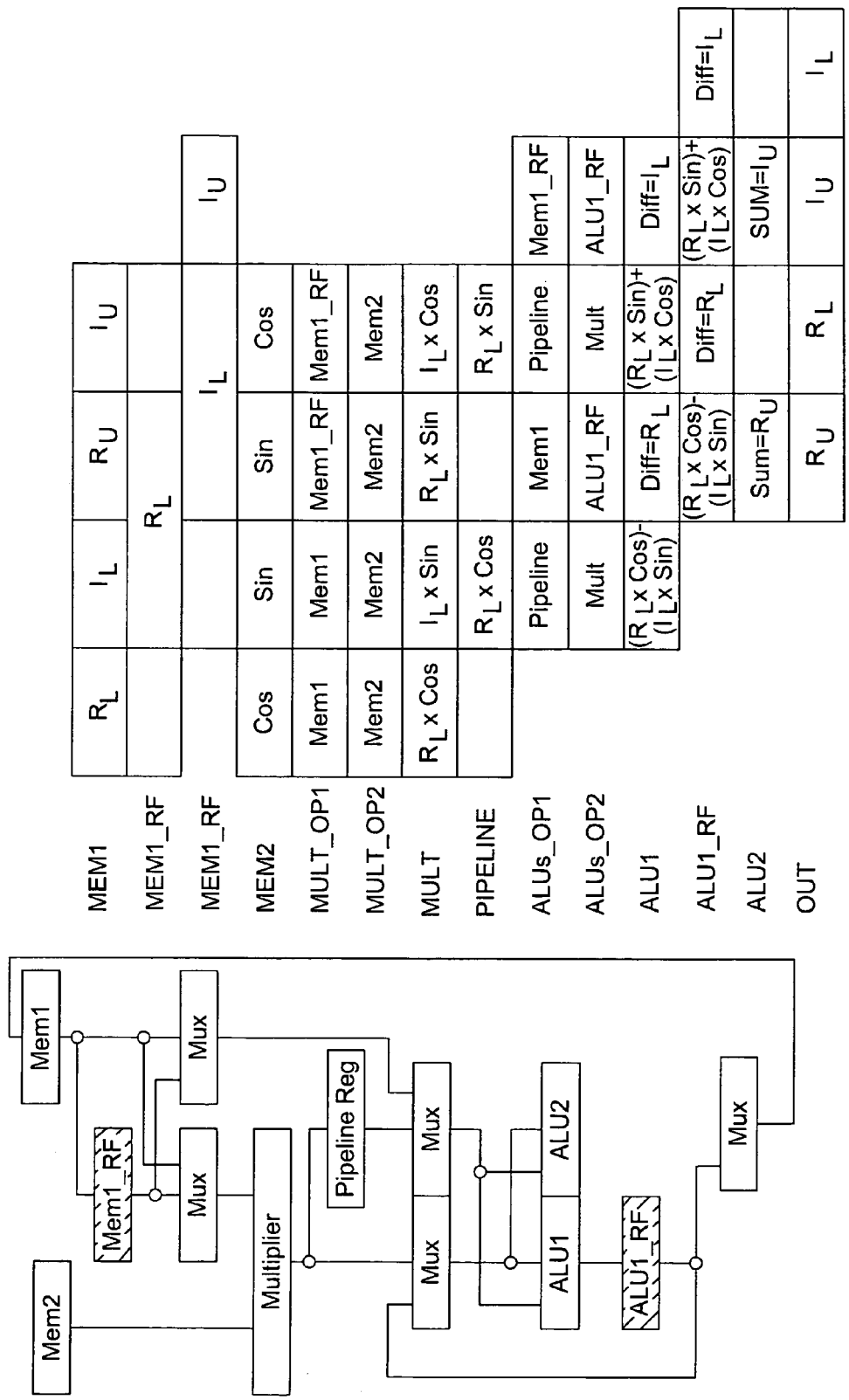
FIG. 12 illustrates a single multiplier, Radix 2 FFT building block.
Figure 13:
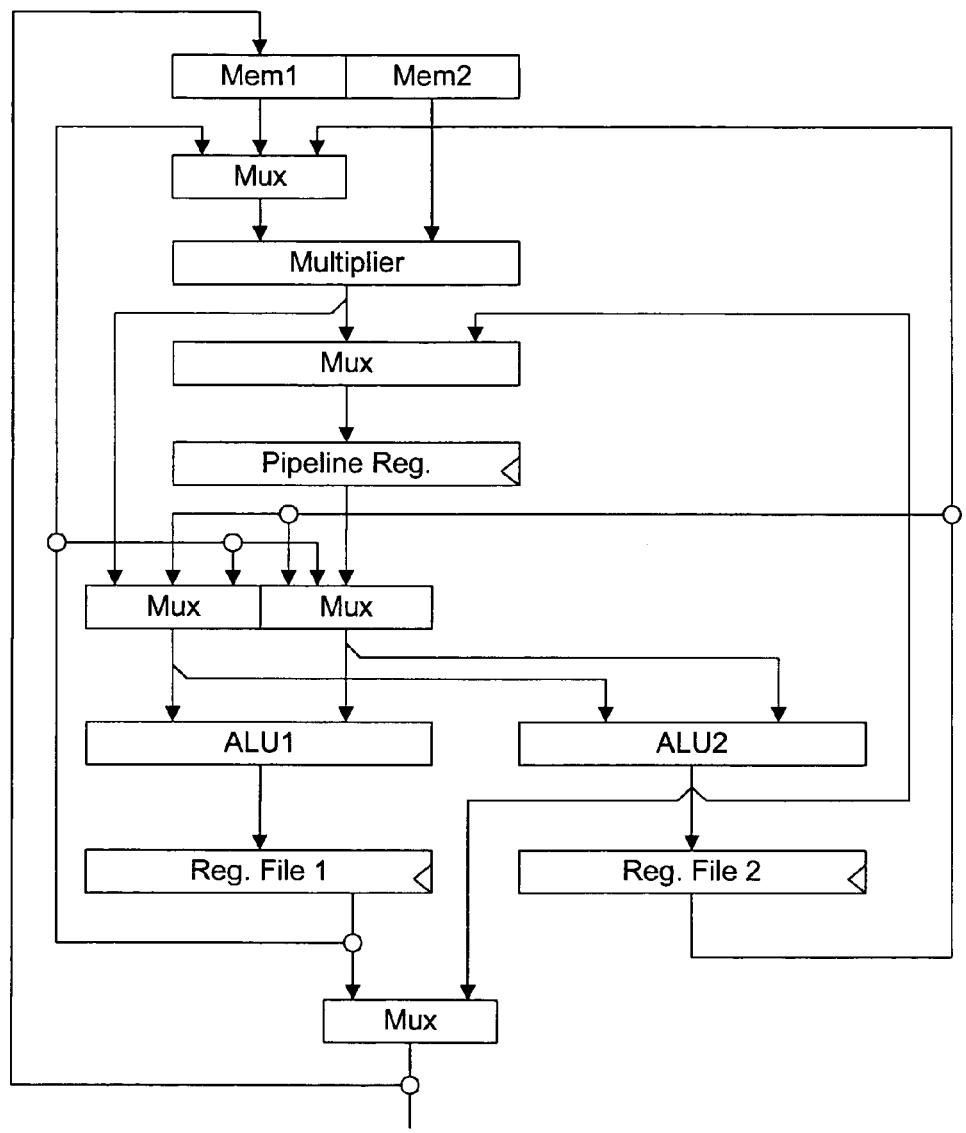
FIG. 13 illustrates a single multiplier IDCT building block.

The matrix interconnection network 110 of FIG. 16, includes subset interconnection networks (not shown). These can include a boolean interconnection network, data interconnection network, and other networks or interconnection schemes collectively and generally referred to herein as "interconnect", "interconnection(s)" or "interconnection network(s)," or "networks," and may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units (or "nodes") and computational elements, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units, components and elements, in lieu of any form of traditional or separate input/output busses, data busses, DMA, RAM, configuration and instruction busses.

It should be pointed out, however, that while any given switching or selecting operation of, or within, the various interconnection networks may be implemented as known in the art, the design and layout of the various interconnection networks, in accordance with the present invention, are new and novel, as discussed in greater detail below. For example, varying levels of interconnection are provided to correspond to the varying levels of the matrices, computational units, and elements. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix or computational unit, however, the interconnection network may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable nodes, or computational units; the nodes, in turn, generally contain a different or varied mix of fixed, application specific computational components and elements that may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110. Details of the ACE architecture can be found in the related patent applications, referenced above.

Reconfigurable Arithmetic Node (RAN)

Figure 1:
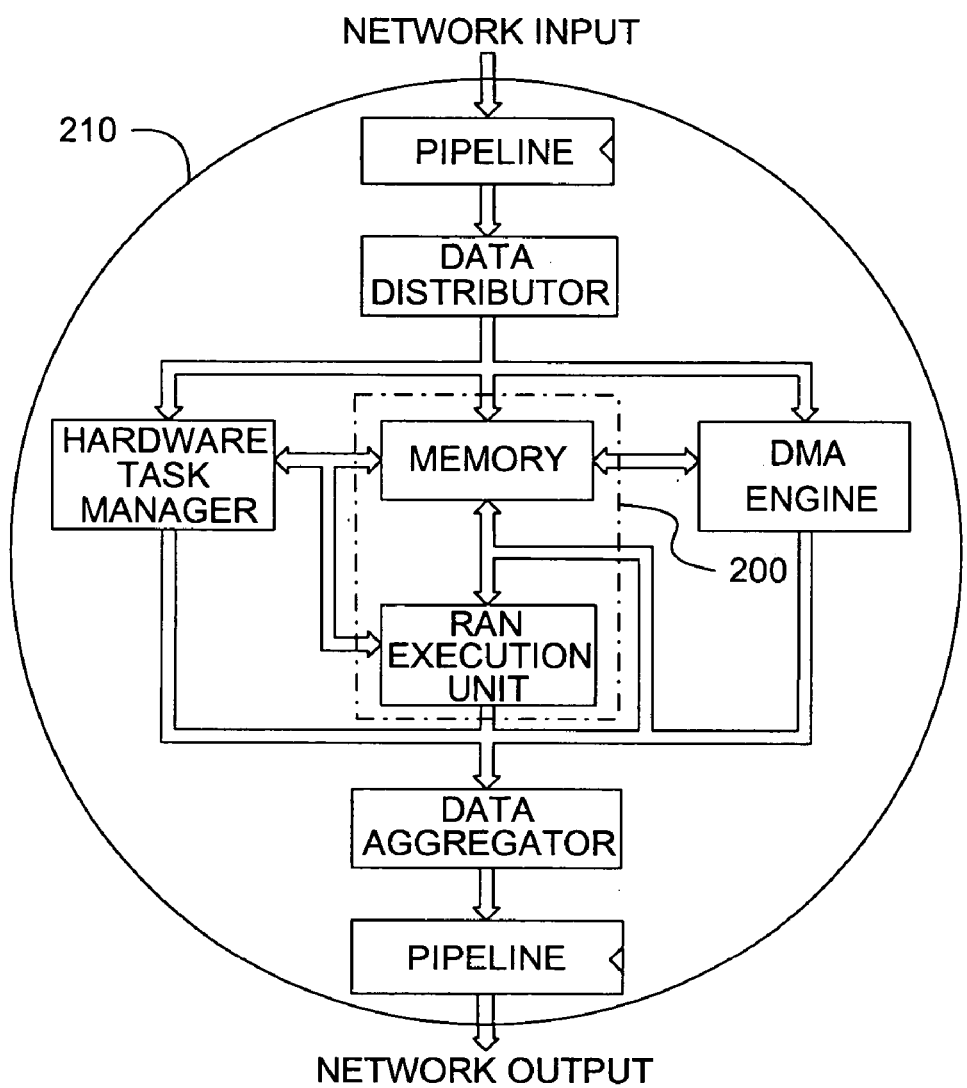
FIG. 1 illustrates a preferred embodiment of the reconfigurable arithmetic node.

FIG. 1 illustrates a preferred embodiment of the reconfigurable arithmetic node (RAN) 200. As described in the related patent applications, a preferred system design uses a common "node wrapper" 210 as an interface between adaptable nodes and a greater system using multiple nodes interconnected by a network. It should be apparent that various features of the RAN can be used in the absence of the system-level features of the preferred embodiment.

The RAN is designed to perform commonly-used digital signal processing (DSP) functions. It is adaptable in accordance with the approaches disclosed in the related applications to perform the functions listed in Table I. Naturally, other approaches can use other designs to achieve other functions. Further, not all of the functions listed in Table I need be achieved in a particular embodiment.

TABLE I

Figure 2:
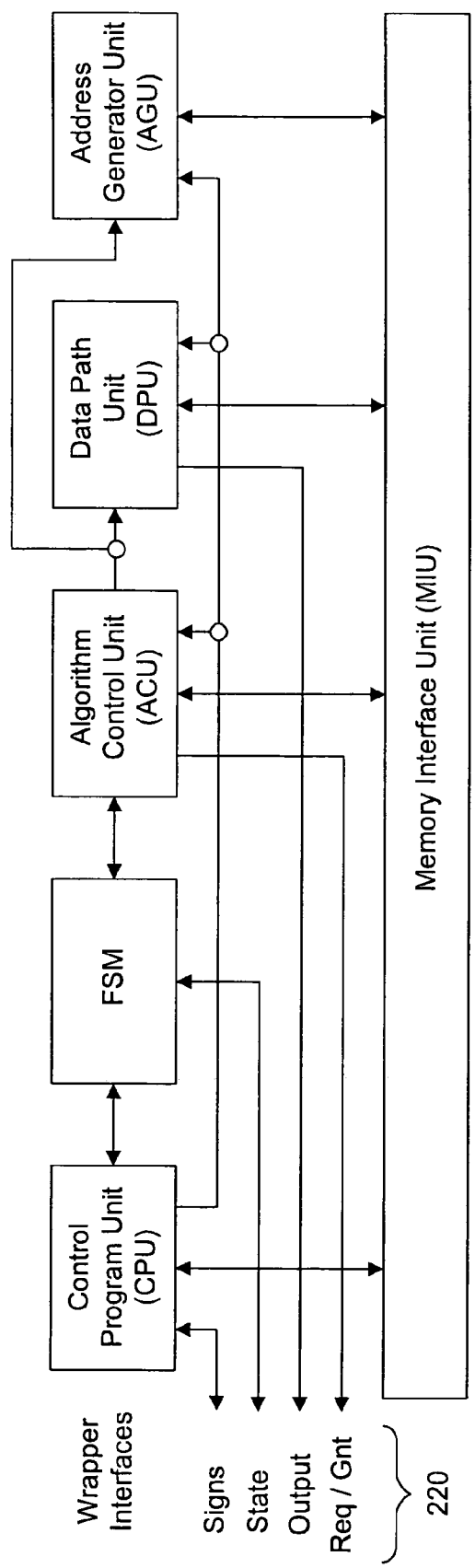
FIG. 2 shows a block diagram of the node's major components.

Asymmetric FIR Filter
Symmetric FIR Filter
Complex Multiply/FIR Filter
Sum-of-absolute-differences (SAD)
Bi-linear Interpolation
Biquad IIR Filter
Radix-2 FFT/IFFT
Radix-2 DCT/IDCT
Golay Correlator
Local Oscillator/Mixer FIG. 2 shows a block diagram of the RAN's major components.

In FIG. 2, control information is passed to the RAN via the node wrapper interface at 220. When the node wrapper signals the RAN to execute a task, a simple FSM alternately selects the Control Program Unit (CPU) or the Algorithm Control Unit (ACU) to perform the various sub-tasks that comprise a task. The CPU controls task setup and teardown and producer/consumer acknowledgements. The ACU controls the Address Generator Unit (AGU) and the Data Path Unit (DPU) while the selected algorithm executes. A Memory Interface Unit (MIU) to the FSM exists but is not shown in FIG. 2.

In a preferred embodiment, the ACU, the AGU, and the DPU components are configurable. Reconfigurability allows efficient execution of the targeted algorithms while minimizing power consumption.

Figure 3:
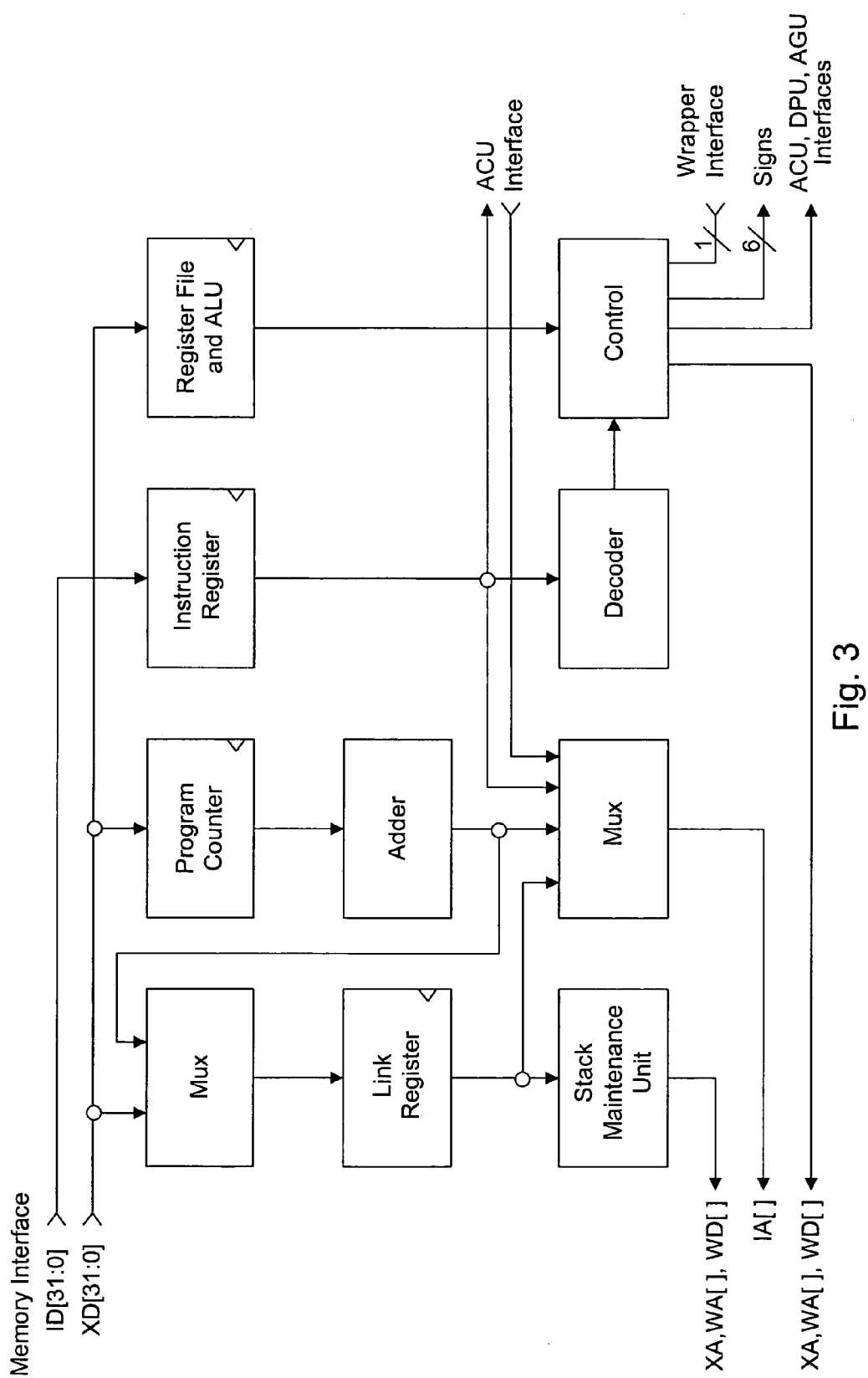
FIG. 3 shows a block diagram of the RAN CPU.

FIG. 3 shows a block diagram of the RAN CPU.

The CPU controls task setup and teardown, buffer acknowledgements, and intra-task processing. More details of task processing can be found in discussions of the hardware task manager in the above-referenced patent applications. The reconfigurable ACU (of FIG. 2) includes variable modulus counters and an FSM to generate regular control sequences that are associated with the targeted algorithms.

The RAN architecture uses two data memory reads and one data memory write per clock period. The required memory addresses are generated by the RAN's AGU. The AGU consists of two READ address generators: Read X_Memory Address Generator Unit (XAGU) and Read Y_Memory Address Generator Unit (YAGU); and one WRITE address generator: Write X|Y_Memory Address Generator Unit (WAGU). Each of the three address generators includes a so-called common part plus a reconfigurable algorithm-specific part. The common part includes registers, adders and multiplexers that are used for all algorithms. The algorithm-specific part includes counter logic that supports a specific algorithm, such as a "perfect shuffle" generator for FFT, a first eight powers of two delay generation for Golay correlators, and a 'row/column' counter for two dimensional DCT.

Figure 4:
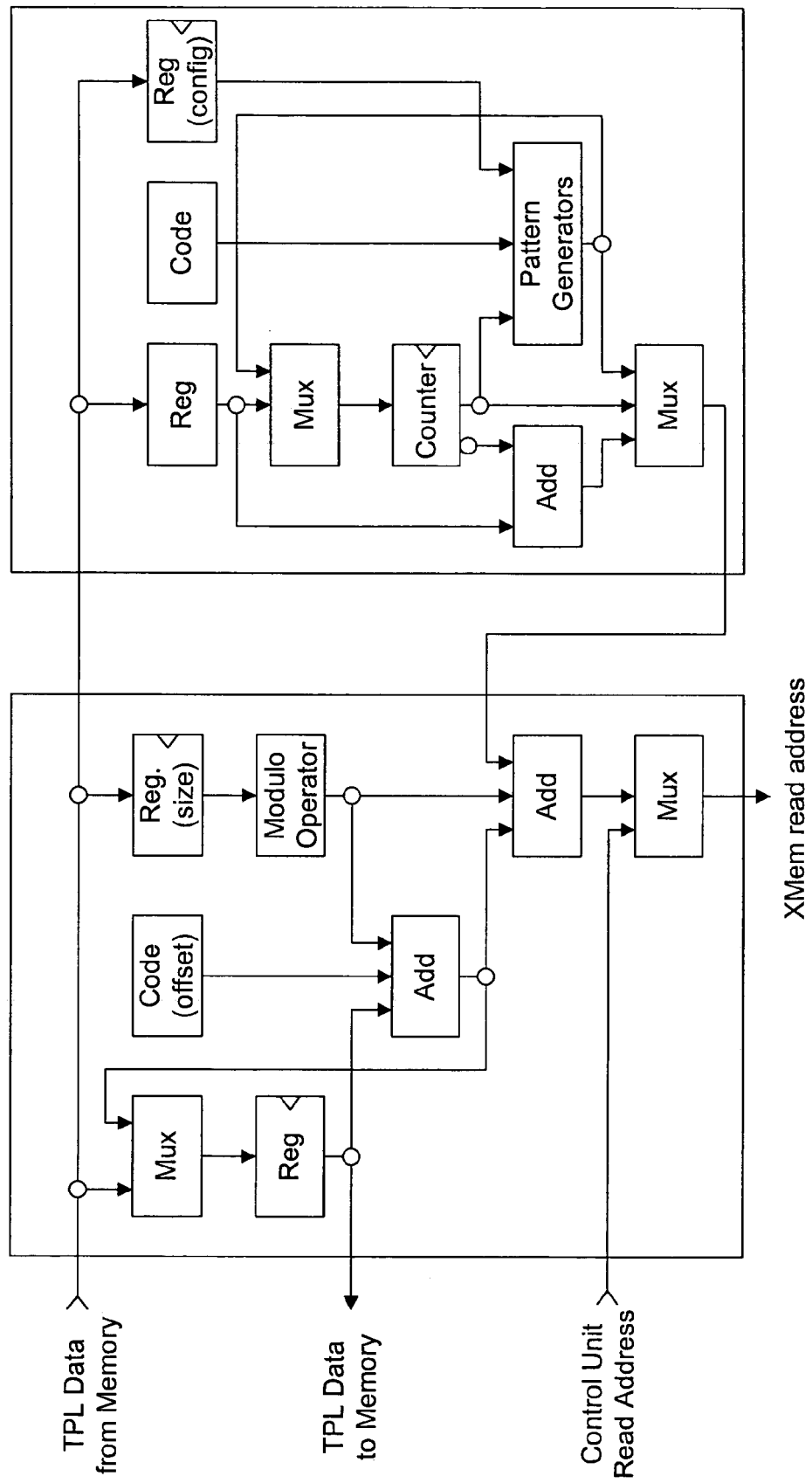
FIG. 4 shows a block diagram for the XAGU.

FIG. 4 shows a block diagram for the XAGU. Its capabilities include FFT "perfect shuffle" addressing, first eight powers-of-two delay generation for Golay correlators, and forward-backward indexing to support the computation of four symmetric FIR filter outputs at one time.

Figure 5:
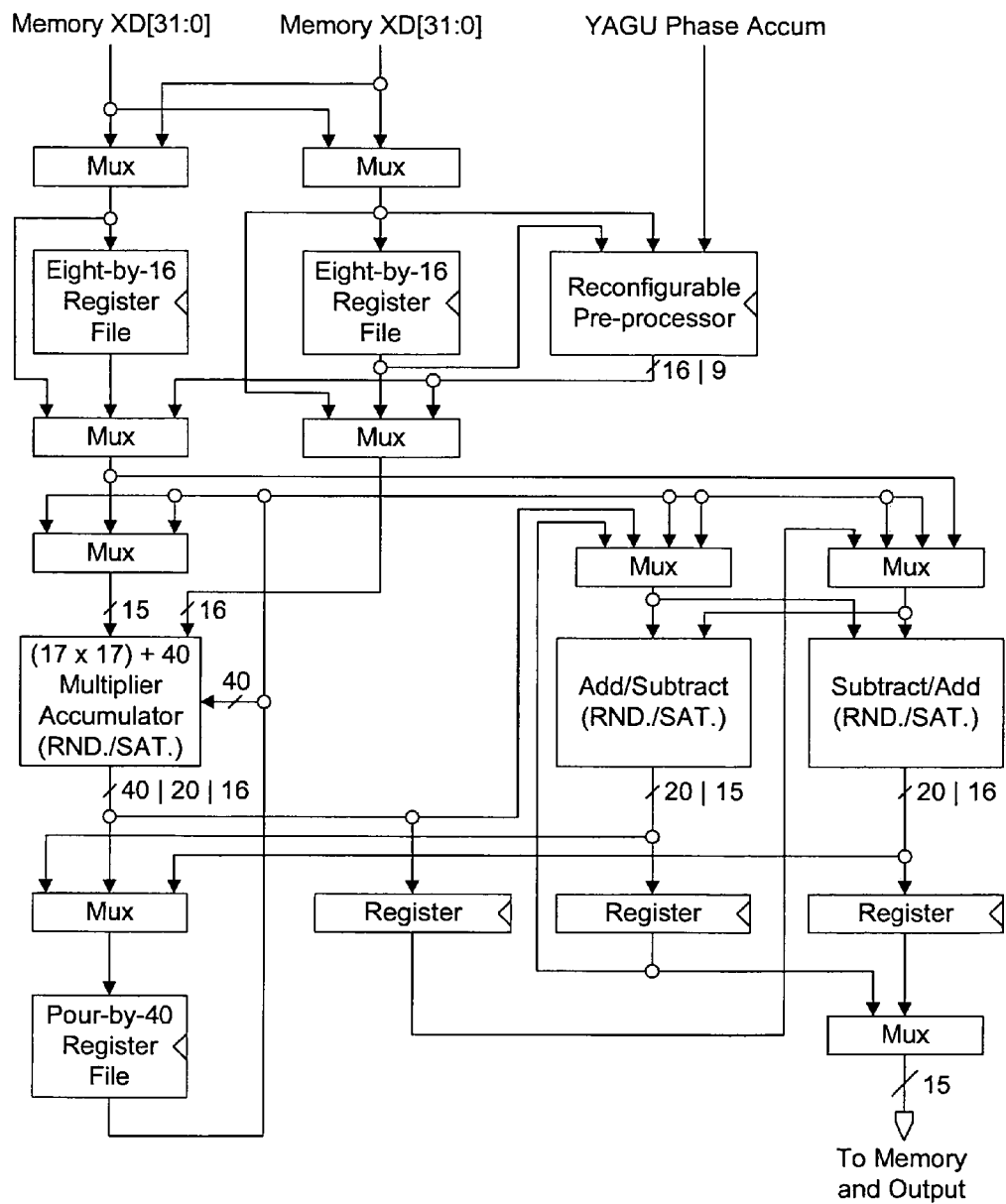
FIG. 5 shows a block diagram of the RAN data path unit.
Figure 6:
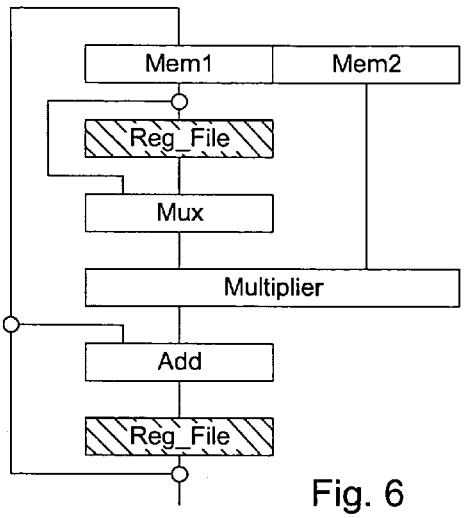
FIG. 6 shows a single multiplier, asymmetric FIR.

The capabilities of the YAGU include the local oscillator function and FFT sine/cosine table address generation. The WAGU also supports FFT "perfect shuffle" addressing and first eight powers of two delay generation for Golay correlators FIG. 5 shows a block diagram of the RAN data path unit (DPU). The DPU's reconfigurable pre-processor allows efficient implementations of trig tables, symmetric filters, and motion-estimation SAD calculations.

The ability of any hardware arithmetic unit to execute any digital signal processing (DSP) algorithm efficiently is a function of many elements of the design, including the number of computational elements and memories and their interconnectivity. We describe eight execution units that are tailored to execute eight specific, widely used algorithms.

These units are near-optimum in the sense that, with the number of computational elements that have been selected, the algorithm will execute in the fewest possible clock cycles. For example, a radix-2 FFT butterfly requires four multiplications and six addition/subtractions. An execution unit with one multiplier and two adder/subtractors can calculate the butterfly in four clock cycles. Removing one of the adder/subtractors would increase the required time to six clock cycles. The second adder/subtractor provides considerable performance gains at a modest incremental cost.

Similarly, the inner loop for an IDCT algorithm can require sixteen multiplications and twenty six addition/subtractions (e.g., a Chen IDCT algorithm). Such an algorithm can be performed in sixteen clock cycles on an execution unit which includes one multiplier and two adder/subtractors.

Figure 14:
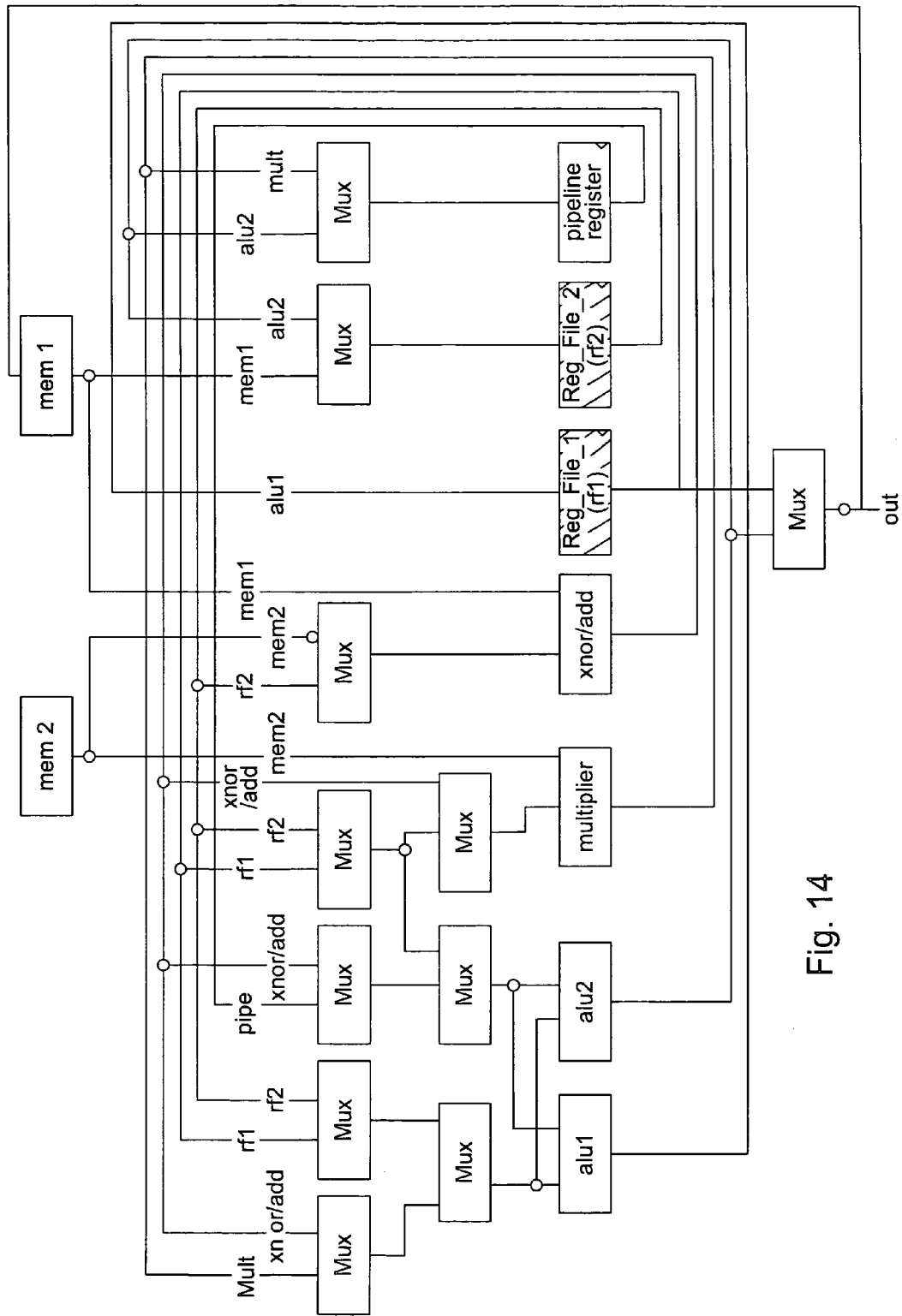
FIG. 14 illustrates a reconfigurable execution unit.

The eight near-optimum execution units for the targeted algorithms are shown in FIGS. 6-13. FIG. 14 shows a configuration of eight execution units that can be used to achieve the functionality of FIGS. 6-13. FIG. 15 is a summary of multiplexer selections for the configurations shown in FIG. 14. Each of these eight execution units is simply a different configuration of the reconfigurable execution unit shown in FIG. 14. For each supported algorithm, the unit is controlled by a combination of static and dynamic control signals. The static signals are held in configuration registers that are initialized prior to starting algorithm execution. The dynamic control signals are generated by a (programmable logic array) PLA-like structure that is driven by a variable-modulus counter that controls the inner loop of the algorithm.

Although the invention has been described with respect to specific embodiments, thereof, these embodiments are merely illustrative, and not restrictive of the invention. For example, any type of processing units, functional circuitry or collection of one or more units and/or resources such as memories, I/O elements, etc., can be included in a node. A node can be a simple register, or more complex, such as a digital signal processing system. Other types of networks or interconnection schemes than those described herein can be employed. It is possible that features or aspects of the present invention can be achieved in systems other than an adaptable system, such as described herein with respect to a preferred embodiment.

Thus, the scope of the invention is to be determined solely by the appended claims.

What is claimed is:

1. A reconfigurable arithmetic node (RAN) in an adaptive computing system configurable to execute any one of a plurality of target algorithms, wherein the target algorithms include an Asymmetric FIR filter, a Symmetric FIR Filter, a Complex Multiply FIR Filter, a Sum-of-absolute-differences, a Bi-linear interpolation, a Bi-quad IIR filter, a Radix-2 Fast Fourier Transform/Inverse Fast Fourier Transform, a Radix-2 Discrete Cosine Transform/Inverse Discrete Cosign Transform, a Golay Correlator, and a Local Oscillator/Mixer, the RAN comprising an execution unit having:

a program control unit (PCU) for controlling task set-up and tear down in the RAN for execution of the one target algorithm;

an algorithm control unit (ACU) for controlling a data path unit and generating a control sequence associated with the one target algorithm of the plurality of algorithms and an address generator unit to selected and enable execution of the one target algorithm; and a finite state machine for receiving control signals to execute one of the target algorithms and for selecting between the PCU and the ACU to execute the one target algorithm.

2. A node as claimed in claim 1 wherein the address generator unit provides addresses to support execution of the algorithm, including two read addresses and one write address to a memory system and two to read address.

3. A node as claimed in claim 2 wherein the address generator unit includes a common part used for substantially all of the target algorithms and an algorithm specific part that supports execution of the specific target algorithm.

4. A node as claimed in claim 1, wherein the address generator unit including first Fourier Transform generator, powers of two delay generators for Golay Correlators and a row/column counter for two dimension discrete cosine transform generation.

5. A node as claimed in claim 4, wherein the address generation unit includes two read address generators and a write address generator.

6. A node as claimed in claim 5 wherein one of the read generator units include Fast Fourier Transform (FFT) addressing, power of two delay generation for a Golay Correlator, and forward-background indexing to support computation of symmetric Finite Impulse Response (FIR) filter outputs.

7. A node as claimed in claim 6, wherein one of the read generators is configured to support a local oscillator and Fast Fourier Transform (FFT) table address generation.

8. A node as claimed in claim 2, further comprising a data path unit coupled to the address generator unit, the algorithm control unit and the control program unit and configured to implement trig tables, symmetric filters and motion information calculations as the target algorithms.

9. A node as claimed in claim 1, wherein the data path unit comprises first and second arithmetic logic units (ALU), a multiplier, an adder/xnor unit, first and second register files, and a pipeline register interconnected by a plurality of multiplexers and between first and second memories and an output, to provide execution of the target algorithms.

10. An adaptive computer comprising a plurality of reconfigurable arithmetic nodes coupled together by a matrix interconnection network for transferring data control and configuration information between and among the reconfigurable arithmetic nodes, each of the nodes comprising a reconfigurable arithmetic node (RAN) configurable to execute any one of a plurality of target algorithms, wherein the target algorithm include an Asymmetric FIR filter, a Symmetric FIR Filter, a Complex Multiply FIR Filter, a Sum-of-absolute-differences, a Bi-linear interpolation, a Bi-quad IIR filter, a Radix-2 Fast Fourier Transform/Inverse Fast Fourier Transform, a Radix-2 Discrete Cosine Transform/Inverse Discrete Cosine Transform, a Golay Correlator, and a Local Oscillator/Mixer, the RAN comprising an execution unit having:

a program control unit (PCU) for controlling task set-up and tear down in the RAN for execution of the one target algorithm;

an algorithm control unit (ACU) for controlling a data path unit and generating a control sequence associated with the one targeted algorithm of the plurality of target algorithms and an address generator unit to enable execution of a specific one of the target algorithms; and a finite state machine for receiving control signals to execute one of the target algorithms and for selecting between the PCU and the ACU to execute the one target algorithm.

11. A node as claimed in claim 10 wherein the address generator unit provides addresses to support execution of the algorithm, including two read addresses and one write address to a memory system.

12. A node as claimed in claim 10 wherein the address generator unit includes a common part used for substantially all of the target algorithms and an algorithm specific part that supports execution of the specific target algorithm.

13. A node as claimed in claim 12, wherein the address generator unit including first Fourier Transform generator, powers of two delay generators for a Golay Correlator and a row/column counter for two dimension discrete cosine transform generation.

14. A node as claimed in claim 13, wherein the address generation unit includes two read address generators and a write address generator.

15. A node as claimed in claim 14 wherein one of the read address generator units include Fast Fourier Transform (FFT) addressing, power of two delay generation for a Golay Correlator, and forward-background indexing to support computation of symmetric Finite Impulse Response (FIR) filter outputs.

16. A node as claimed in claim 15, wherein one of the read generators is configured to support a local oscillator and Fast Fourier Transform (FFT) table address generation.

17. A node as claimed in claim 11, further comprising a data path unit coupled to the address generator unit, the algorithm control unit and the control program unit and configured to implement trig tables, symmetric filters and motion information calculations as the target algorithms.

18. A node as claimed in claim 10, wherein the data path unit comprises first and second arithmetic logic units (ALU), a multiplier, an address unit, first and second register files, and a pipeline register interconnected by a plurality of multiplexers and between first and second memories and an output, to provide execution of the target algorithms.

* * * * *

UNITED STATES PATENT AND TRADEMARK OFFICE
CERTIFICATE OF CORRECTION

| | |
|---|---|
| PATENT NO. | : 7,433,909 B2 |
| APPLICATION NO. | : 10/443596 |
| DATED | : October 7, 2008 |
| INVENTOR(S) | : W. James Scheuermann |

It is certified that error appears in the above-identified patent and that said Letters Patent is hereby corrected as shown below:

Title page, item [57] in Abstract, Line 1 replace "in a adaptable" with --in an adaptable--.

Title page, item [57] in Abstract, Line 11 replace "Cosign" with --Cosine--.

Title page, item [57] in Abstract, Line 12 replace "Cosign" with --Cosine--.

In Column 1, Line 64 replace "Cosign" with --Cosine--.

In Column 6, Line 59 replace "Cosign" with --Cosine--.

Signed and Sealed this

Thirteenth Day of January, 2009

JON W. DUDAS
*Director of the United States Patent and Trademark Office*